United States Patent Office 3,544,590
Patented Dec. 1, 1970

3,544,590
CYCLIC AMINES AND THE PROCESS FOR THEIR FORMATION
Allen R. Kittleson, Westfield, N.J., assignor to Esso Research and Engineering Company, a corporation of Delaware
No Drawing. Continuation-in-part of application Ser. No. 634,458, Apr. 28, 1967. This application Apr. 10, 1968, Ser. No. 721,560
Int. Cl. C07d 27/30
U.S. Cl. 260—326.5      22 Claims

ABSTRACT OF THE DISCLOSURE

Monocyclic and bicyclic amine compositions such as 1-aza bicyclo (3.3.0) octanes, 1-aza bicyclo (4.3.0) nonanes, 1-aza bicyclo (4.4.0) decanes, amino substituted pyrrolidine and piperidine compounds as well as their organic substituted derivatives are secured through the catalytic hydrogenation of keto dinitrile compounds such as 1,5-dicyano pentanone-3. The compositions are useful as additives for lubricating oil compositions, as epoxy curing agents, polyurethane catalysts, etc.

CROSS-REFERENCE TO RELATED APPLICATIONS

This application is a continuation-in-part of Ser. No. 634,458, filed Apr. 28, 1967 and now abandoned, in the name of Allen R. Kittleson.

BACKGROUND OF THE INVENTION

Field of the invention

This invention pertains to amino substituted pyrrolidine and piperidine compounds and nitrogen containing bicyclo organic compounds and to the process for their formation. More particularly, the invention relates to the formation of 1-aza bicyclo octanes, nonanes, and decanes as well as 3-amino propyl or 4-amino butyl substituted pyrrolidine or piperidine compounds and to the catalytic hydrogenation process for their formation.

Description of the prior art

The existence of bicyclo nitrogen containing compounds, in particular, 1-aza bicyclo (3.3.0) octane (pyrrolizidine) has been reported in the literature. (See Advances in Heterocyclic Chemistry, vol. 5, edited by A. R. Katritzky, Academic Press (1965), page 315 et. seq.) The synthesis of various 1-aza bicyclo octane and higher compounds has also been reported; however, the synthesis operations generally involve extremely sophisticated process steps and relatively expensive starting reagents. For example, pyrrolizidines have been prepared (a) through the intermolecular acylation of amino acids; (b) through the reductive cyclization of nitropimelates and related compounds; etc.

SUMMARY OF THE INVENTION

Now, in accordance with the present invention, it has been discovered that various types of bicyclo nitrogen containing octanes, nonanes, and decanes and their hydrocarbon substituted derivatives, as well as amino substituted pyrrolidine and piperidine compounds can be readily obtained through the catalytic hydrogenation of keto dinitrile compositions. The hydrogenation is conducted employing conventional catalysts at moderate to rigorous temperature and hydrogen pressure conditions. The tertiary bicyclic amines and the primary, secondary monocyclic amines thus produced have many varied uses and in particular find utility as lubricating oil additives, epoxy resin curatives, polyurethane catalysts, etc. In addition, the bicyclic tertiary amines produced with the present hydrogenation process can be reacted with an acid or alkyl halide to form quaternary ammonium salts which have been shown to be highly effective parasiticides.

According to the present invention, a keto dinitrile compound, in particular 1,5-dicyano pentanone-3, 1,6-dicyano hexanone-3, 1,7-dicyano heptanone-4, or an organic substituted derivative thereof, in particular, $C_1$–$C_{10}$ lower alkyl substituted derivatives thereof are contacted with hydrogen in a solvent medium in the presence of a conventional hydrogenation catalyst to arrive at monocyclic and bicyclic compositions having the general formulas:

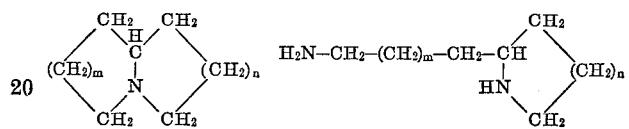

wherein m and n are either 1 or 2. Compounds falling within the generic formulas include 2(3-amino propyl) pyrrolidine; 2(3-amino propyl) piperidine; 2(4-amino butyl)pyrrolidine; 2(4-amino butyl) piperidine; 1-aza bicyclo (3.3.0) octane; 1-aza bicyclo (4.3.0) nonane; and 1-aza bicyclo (4.4.0) decane. It should be recognized that organic substituted, particularly hydrocarbon substituted derivatives of the above compounds can also be prepared through the catalytic hydrogenation of organic or hydrocarbon substituted keto dinitriles.

For example, a 1,5-dinitrile of a 1,5-substituted 1,4-pentadiene-3-one can be catalytically hydrogenated to form a 1-aza, 3,7-substituted bicyclo (3.3.0) octane according to the following equation:

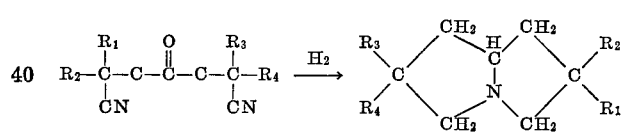

wherein $R_1$, $R_2$, and $R_3$ and $R_4$ are each selected from the group consisting of hydrogen, alkyl, aralkyl, aryl, alkylaryl, cycloalkyl, alkoxyaryl, hydroxyaryl and aminoaryl containing from 1 to 30 carbon atoms, more preferably 1 to 10 carbon atoms. Preferably, $R_1$, $R_2$, $R_3$, and $R_4$ are alkyl, aralkyl, aryl, alkylaryl and alkoxyaryl radicals. Most desirably, $R_1$, $R_2$, $R_3$, and $R_4$ are lower alkyl radicals, in particular methyl and ethyl radicals. Representative examples of substituents that may be attached to the bicyclooctane compound at the 3 and 7 positions are methyl, ethyl, propyl, butyl, hexyl, octyl, decyl, dodecyl, benzyl, phenyl, cyclohexyl, isopropyl, amyl, p-methylphenyl, etc. The compounds produced according to the above equation can be either mono-substituted at the 3 or 7 position, di-substituted at the 3 or 7 position, mono-substituted at the 3 and di-substituted at the 7 position, or di-substituted at both the 3 and 7 positions. The above idenified substituents may also be present on 1,7-dicyano heptanone-4 and 1,6-dicyano hexanone-3 compounds.

The various keto dinitrile reagents can be prepared using a number of different techniques. For example, substituted 1,4-pentadiene-3-ones, 1,6-heptadiene-4-ones, and 1,5-hexadiene-3-ones can be reacted with 2 moles of hydrogen cyanide in order to arrive at the desired compounds. In addition, a 1,5-dicyano pentanone-3 compound can be prepared by reacting divinyl ketone with sodium cyanide in the presence of water. 1,6-dicyano hexanone-3 materials can be prepared according to the following equation:

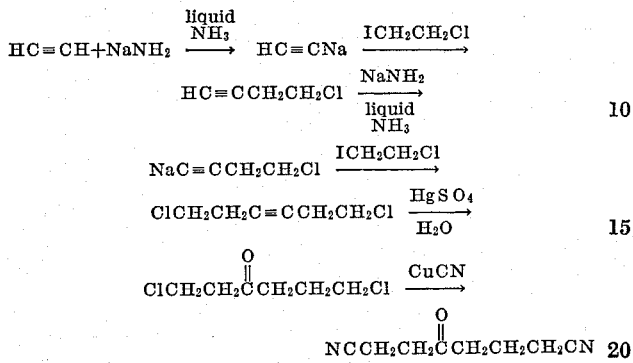

1,7-dicyano heptanone-4 compounds can be prepared by reacting a 1,7-dihalo-4-heptanone with CuCN. The 1,7-dihalo-4-heptanones are prepared according to the procedure of U.S. 2,979,529, the disclosure of which is herein incorporated by reference.

The formation of the monocyclic and bicyclic amine compounds of the present invention is accomplished through the hydrogenation of the keto dinitriles. The instant hydrogenation reactions may be carried out in either one stage or in two stages. The two-stage reaction is preferred as with this system higher selectivities to desired products is usually achieved. In a two-stage system, the first stage is carried out under mild conditions and preferably using an active catalyst to minimize the hydrolysis of the nitrile groups of the starting reactant to amides (this occurs using the water formed in the reductive amination of the keto group). The second stage of the reaction is conducted at a more elevated temperature for a time sufficient to form the desired yield of product.

Conventionally, the hydrogenation reactions are conducted in the presence of a solvent. Useful solvents include $C_5$–$C_{20}$, preferably $C_5$–$C_8$ straight chain, branched chain or cyclic chain aliphatic hydrocarbons, e.g., hexane, isooctane, dodecane, cyclohexane, cyclooctane, etc.; $C_6$–$C_{20}$, preferably $C_6$–$C_{12}$ aryl and alkylaryl hydrocarbons, e.g., benzene, toluene, xylene, diethyl benzene, etc.; and $C_2$–$C_{20}$, preferably $C_2$–$C_{10}$ lower aliphatic oxygenated compounds, preferably monoalcohols and ethers, e.g., ethanol, butanol, tetrahydrofuran, ethyl butyl ether, cyclohexanol, dibutyl ether, diethyl ether, etc. On a weight basis, solvents are present in the reaction system at from 5 to 90 wt. percent, preferably 50 to 90 wt. percent, more preferably 60 to 80 wt. percent, based on the total reaction mixture. On a volume basis, it is desirable to have at least about one volume of solvent per volume of reactant present in the hydrogenation reaction zone. More desirably, at least about 2 volumes of solvent are present for every volume of dinitrile in the reaction zone. Larger quantities of solvent may be employed. At low solvent levels the hydrolysis of the nitrile groups to undesired amides is a more significant problem.

It is ordinarily necessary to conduct the hydrogenation reaction in the presence of some solvent. In a one-stage system, solvent is necessary. In a two-stage operation, solvent is desired only for the first stage. The hydrogenation reaction may be conducted in the presence of ammonia; however, it has been found that the presence of ammonium is not necessary in the present system as there is no significant polymer formation with the hydrogenation scheme in the absence of ammonia.

Conventional hydrogenation catalysts are employed in the practice of the instant invention. Useful materials include platinum group metals and metal oxides as well as Raney nickel and Raney cobalt. Representative examples of useful materials include supported or unsupported nickel, platinum, platinum oxide, rhodium, ruthenium, and palladium. Examples of preferred catalyst systems include Raney nickel, Raney nickel and platinum oxide, or Raney nickel and ruthenium. Preferred Raney nickel catalysts have surface areas varying from 1 to 20 square meters per gram of catalyst. Generally from 0.1 to 10 wt. percent of catalyst, based on dicyano ketone compound is employed in the reaction. Amounts of catalyst in excess of 10 wt. percent can be used but to no apparent advantage. The catalyst should be present in the reaction zone in amounts sufficient to cause the reaction to proceed as quickly as possible and to prevent large-scale hydrolysis of the nitrile compounds and intermediate imine compounds.

In general, the monocyclic and bicyclic amine compounds of the present invention can be prepared at hydrogen pressures as low as 50 p.s.i.g. and at temperatures of at least about 50° C. Preferably, however, the hydrogen pressure in a one-stage system or in the first stage of a two-stage system varies between 300 and 3000 p.s.i.g. In most situations, the hydrogenation reactions are conducted at temperatures varying from 100 and 300° C.

In a one-stage operation where the desired predominant product is the bicyclic composition, hydrogen pressures may vary between 300 and 3000 p.s.i.g. and temperatures may range from 200 to 275° C. At the higher levels of the temperature range, lower hydrogen pressures may be employed. At these conditions, hydrogen uptake is completed in several minutes; however, it is desirable to continue the reaction for a period varying from several minutes to about four hours.

In the preferred two-stage operation, the keto dinitriles are contacted with excess hydrogen at hydrogen pressures varying from between 700 to 1000 p.s.i.g. at temperatures varying from about 75 to 150°, preferably 100 to 125° for a time until hydrogen uptake is substantially completed. This period can vary from 15 min. to 2 hours. Thereafter, in the second portion of the operation and optionally after the solvent employed has been removed from the system, the reaction temperature is increased to a level varying between 225 and 300° C., preferably 250 to 275° C. at a hydrogen pressure varying from 500 to 1500 p.s.i.g. This second portion of the two-stage operation is conducted for a period varying from about 2 to 10 hours, preferably from about 4 to 8 hours. These protracted reaction times are necessary to secure substantial yields of product, although it should be recognized that some product is formed instantaneously.

In the above-described two-stage operation, the predominant reaction product is the bicyclic compound; however, minor amounts of amino substituted pyrrolidine or piperidine products are formed. When the monocyclic amine materials are the desired predominant product, milder conditions are employed. Hence, in the case of a one-stage system, temperatures varying from about 175 to 225° C. should be employed. Similarly, in a two-stage system, the second step temperatures should be maintained between about 175 and 225° C. Hydrogen pressures identical to those employed in the formation of bicyclic materials can be used. In general, the monocyclic product is formed in a shorter period of reaction time than is the case with the bicyclic materials.

It is necessary that the reaction be conducted in the substantial absence of water if high yields of product are to be formed. Preferably, the water content of the reaction mixture is maintained at a level below about 1 wt. percent water, based on total reactants, more preferably less than 0.1 wt. percent water, based on total reactants. To achieve these low water levels, care should be taken to dry the hydrogen, solvents and keto dinitrile employed prior to introducing the same into the reaction zone.

The monocyclic and bicyclic compounds of this invention may generally be employed as oil additives in concentrations ranging from about 0.0005 to about 10, preferably 0.001 to 5 wt. percent (based on weight of hydrocarbon) in hydrocarbon compositions ranging from gasoline fractions through middle distillate fuels and lubricating oils.

This invention is also directed to quaternary ammonium salts of the monocyclic and bicyclic amine materials of the present invention which salts are made by reacting an acid or alkyl halide with the cyclic amine compound. Ordinarily ammonium bases are prepared by reacting the quaternary ammonium salt with a base such as a metal hydroxide. These quaternary ammonium salts are highly effective parasiticides.

The acids which can be employed for making the quaternary ammonium salts of this invention may be any organic or inorganic acid such as sulfuric acid, hydrochloric acid, hydrogen cyanide, sulfurous acid, chloroplatinic acid, picric acid, sulfonic acids, etc.; the organic halides may be for example, bis-chloromethyl durene, methyl bromide, methyl iodide, dodecyl bromide, methyl chloride, ethyl bromide and benzyl chloride.

The metal oxides and hydroxides which can be used to form quaternary ammonium bases from the quaternary ammonium salts include the hydroxides of the metals of Groups I-A, I-B, II-A and II-B of the Periodic Chart of the Elements such as set forth at pages 394 and 395 of the Handbook of Chemistry and Physics, 38th edition. As preferred compounds which may be used in making the quaternary ammonium bases of the instant invention, there can be named compounds such as calcium hydroxide, potassium hydroxide, sodium hydroxide, silver oxide and hydroxide.

The quaternary ammonium bases and salts have the general formula:

wherein A is a substituted or unsubstituted 1-aza bicyclo (3.3.0)octane, a 1-aza bicyclo(4.3.0)nonane, a 1-aza bicyclo (4.4.0)decane, a 2(3-aminopropyl)pyrrolidine, a 2(3 - aminopropyl)piperidine, a 2(4 - aminobutyl)pyrrolidine, or a 2(4-aminobutyl)piperidine; $R_5$ is attached to the ring nitrogen atom of the monocyclic and bicyclic amine compounds and may be either a hydrogen radical or a hydrocarbon or substituted hydrocarbon radical having from 1 to 30 carbon atoms, preferably a straight chain, branched chain or cyclic chain alkyl radical, an aralkyl radical, or a bis-(alkylene)aryl radical; and X is an organic or inorganic anion such as fluoride, bromide, iodide, chloride, cyanide, sulfate, sulfite or hydroxyl anion. Particularly useful materials include compositions having the general formula:

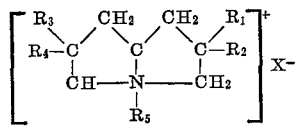

wherein $R_1$, $R_2$, $R_3$, $R_4$, $R_5$ and X are as previously defined. The quaternary ammonium hydroxides are effective soluble catalysts in organic systems requiring the use of strong bases. In these systems, most inorganic bases are insoluble or only slightly soluble.

DESCRIPTION OF PREFERRED EMBODIMENTS

The following embodiments are submitted in order to more particularly point out the invention.

EXAMPLE 1

Preparation of 2(3-amino-2,2-dimethyl propyl) 4,4-dimethyl-4,5-dihydro-3Hpyrrole (A)

One hundred and fifty grams of phorone dinitrile (obtained by the addition of HCN to 2,6-dimethyl 2,5-heptadiene 4-one [phorone]) was added to absolute ethanol which had been saturated with ammonia, and seven grams of Raney Ni were added. This mixture was charged to a rocking autoclave. The hydrogen pressure varied from 350 to 1500 p.s.i.g. and the temperature from 80° to 162° C. Hydrogen uptake stopped within five hours. After removal of catalyst and solvent, the product was fractionated giving 91.8 grams distilling at 112° C. at 10 mm. mercury absolute, i.e. a yield of 61 wt. percent based on dinitrile starting material. Elemental analysis gave C, 72.7%; H, 12.4% and N, 15.9% density at 23° C. 0.8897, refractive index at 20° 1.4679.

Infrared (I.R.) and nuclear magnetic resonance (N.M.R.) spectra showed that the product exists in either of two forms in equilibrium or more substantially in one or the other form depending on whether they are admixed with a polar or nonpolar solvent. These structures are represented by the formulae:

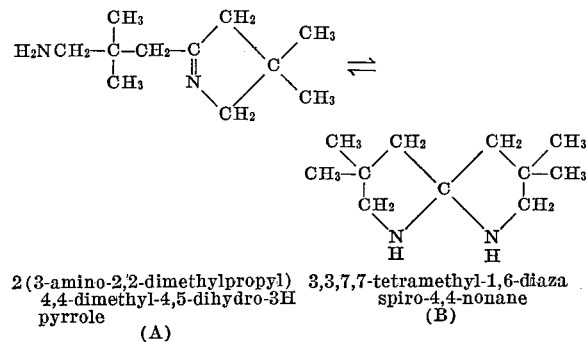

2(3-amino-2,2-dimethylpropyl) 4,4-dimethyl-4,5-dihydro-3H pyrrole (A)

3,3,7,7-tetramethyl-1,6-diaza spiro-4,4-nonane (B)

If other substituted 1,4-pentadiene 3-ones are reacted with HCN and subsequently reduced, compound A may have other substituents in the 2 position of the 3-amino propyl group as well as in the 4 position of the 4,5-dihydropyrrole ring. The same would apply to the 3 and 7 positions of the 1,6-diaza spiro-4,4-nonane.

EXAMPLE 2

Preparation of 1-aza 3,3,7,7-tetramethyl bicyclo (3.3.0) octane from (A) and/or (B)

Three hundred and twenty grams of (A) and/or (B), 500 grams of tetrahydrofuran, 2 grams of platinum oxide and 4 grams of Raney Ni were charged to a high pressure autoclave. The reactor was pressured to 400 p.s.i.g. with hydrogen and, while rocking, was heated to 250° C. Reaction was continued for eight hours, after which the reactor was cooled and the catalyst filtered off. After stripping off the solvent, the residue was fractionated under reduced pressure. There was recovered 201 grams of product distilling at 67° to 68° C. at 10 mm. Hg absolute, i.e. a yield of 63 wt. percent based on (A) and/ or (B) starting material or 38 wt. percent based on the dinitrile feed to Example 1. Analysis showed 8.15% N, 78.3, C 12.8% H. Theoretical analysis for 1-aza 3,3,7,7-tetramethyl bicyclo (3.3.0) octane is 8.32% N, 79.11% C, and 12.57% H. Potentiometric titration showed it to be a very strong base, having a $pK_b$ value of 3.0. It has a density of 0.8475 at 23° C. and a refractive index at 20° C. of 1.4514. Its structure was verified by I.R. and N.M.R.

EXAMPLE 3

Preparation of 1-aza 3,3,7,7-tetramethylbicyclo (3.3.0) octane from phorone dinitrile One hundred and ninety-two grams of phorone dinitrile in 600 ml. of ethanol saturated with ammonia and 2 grams of Raney Ni plus 2 grams of $PtO_2$ was hydrogenated at 225° to 242° C. and 1300 to 1550 p.s.i.g. $H_2$ pressure. Fractionation gave 16.5 grams of product distilling at 67° to 68° C. at 10 mm., i.e. a yield of 9 wt. percent based on dinitrile feed. This fraction had the same titration curve and I.R. and N.M.R. as that designated as 1-aza 3,3,7,7-tetramethylbicyclo (3.3.0) octane.

EXAMPLE 4

Preparation of the bis quaternary ammonium salt from bis chloromethyl durene and 1-aza 3,3,7,7-tetramethylbicyclo (3.3.0) octane 0.05 mole (11.6 grams) of bis chloromethyl durene and 0.12 mole (20 grams) of 1-aza 3,3,7,7-tetramethylbicyclo (3.3.0) octane were refluxed in 150 ml. of absolute ethanol for 1.5 hours. The ethanol was stripped off and the residue washed with benzene. Recovered 15.7 grams of a white solid having the following structure.

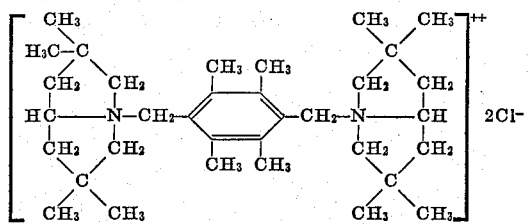

*Analysis.*—Theory (percent): C, 72.43; H, 10.01; N, 4.97; Cl, 12.59. Found (percent): C, 72.18; H, 10.47; N, 4.35; Cl, 14.6.

This bis quaternary ammonium chloride was tested as a nematocide with the following results.

|  | Dose, p.p.m. | Percent kill (Vanagrellus) | | |
|---|---|---|---|---|
|  |  | 24 hours | 72 hours | 120 hours |
| Nemagon* | 500 | 100 | 100 | 100 |
|  | 50 | 35 | 40 | 75 |
|  | 5 | 0 | 5 | 20 |
| Compound | 500 | 100 | 100 | 100 |
|  | 50 | 75 | 100 | 100 |
|  | 5 | 10 | 50 | 100 |

*Commercial nematocide consisting essentially of 97% of 1,2-dibromo 3-chloropropane and 3% of other active compounds.

EXAMPLE 5

Preparation of N-dodecyl 1 - aza 3,3,7,7 - tetramethyl bicyclo (3.3.0) octyl ammonium bromide 5.463 grams of 1-aza 3,3,7,7-tetramethyl bicyclo (3.3.0) octane and 10 grams of n-dodecyl bromide were refluxed in 100 ml. of absolute ethanol for eighteen hours. After stripping off the ethanol, the residue was washed with petroleum ether and dried. Recovered 10 grams of a pink solid having the following structure:

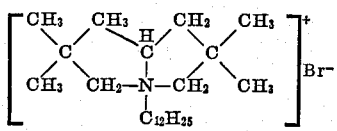

This compound was tested for fungicidal activity by the slide germination technique as described by Wellman & McCallan (Contributions of the Boyce Thompson Institute, vol. 3, No. 3, pages 171 to 176).

FUNGICIDAL ACTIVITY

Standard-Captan*: +=100% germination
Inhibition of germination: −=100% inhibition

| Conc. | 0.1% | | 0.01% | | 0.001% | | 0.0001% | |
|---|---|---|---|---|---|---|---|---|
|  | Std. | Cpd. | Std. | Cpd. | Std. | Cpd. | Std. | Cpd. |
| *Monilia fructicula* | − | − | − | − | − | − | + | + |
| *Alternaria atteracea* | − | − | − | − | − | + |  |  |

*Commercial fungicide consisting of N-trichloro-methylthio-tetrahydrophthalimide.

EXAMPLE 6

Preparation of 1-aza 3,7-bis (p-methoxyphenyl) bicyclo (3.3.0) octane

The dinitrile of dianisalacetone

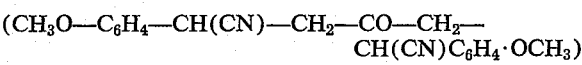

was prepared by the addition of HCN to a solution of dianisalacetone in dimethyl sulfoxide using trimethylbenzyl ammonium hydroxide as a catalyst while maintaining a pH of between 11 to 12. Analysis of the dinitrile showed: 72.4% carbon, 5.87% hydrogen and 8.06% nitrogen. Theory for the formula shown above requires: 72.4% C, 5.80% H and 8.02% N.

The dinitrile was hydrogenated for 6 hours at 125° C. and 1500 p.s.i.g. in tetrahydrofuran saturated with ammonia using a Raney nickel catalyst. The catalyst and solvent were removed from the product. A new supply of tetrahydrofuran was added in the proportion 73 grams of product per 1200 grams of tetrahydrofuran and a second stage hydrogenation was conducted by pressuring the reactor with hydrogen to 500 p.s.i.g. at room temperature and then heating to 250° C. and reacting for 10 hours on a rocking autoclave. The tertiary amine product produced by the reaction had a melting point of 113 to 114° C. and showed on analysis the following:

Theory (percent). C, 78.40; H, 7.76; N, 4.34. Found (percent): C, 78.10; H, 7.94; N, 4.34.

EXAMPLE 7

Preparation of 2(3-amino-2,2-dimethyl propyl) 4,4-dimethyl pyrrolidine

One hundred and fifty grams of a mixture of 2(3-amino-2,2-dimethyl propyl) 4,4-dimethyl-4,5-dihydro 3H pyrrole and 3,3,7,7-tetramethyl 1,6-diaza spiro-4,4-nonane secured via the procedure of Example 1 were dissolved in 500 ml. of tetrahydrofuran and admixed with 2 grams of Raney nickel and 2 grams of platinum oxide. The total mixture was then charged into a high pressure autoclave. Hydrogen was introduced into the autoclave and maintained at a pressure of 1800 p.s.i.g. during the course of the hydrogenation reaction which was conducted at 225° C. for a four hour period. Upon completion of the reaction, the catalyst and solvent were removed from the product and the product material fractionated. The fractionation was conducted at a pressure of 10 ml. of mercury. The first overhead cut boiled at a temperature between 69 and 72° C. and was composed of 7.3 grams of 1-aza-3,3,7,7-tetramethyl bicyclo (3.3.0)octane. The second cut, which was secured at a distillation temperature varying between 72 and 110° C. was composed of 12.3 grams of a mixture of the bicyclo octane compound and 2(3-amino-2,2-dimethyl propyl) 4,4-dimethyl pyrrolidine. The last cut, which was taken at a temperature of 110° C. consisted of 81 grams of the desired 2(3-amino-2,2-dimethyl propyl) 4,4-dimethyl pyrrolidine product.

What is claimed is:

1. A process for the preparation of monocyclic and bicyclic amine compositions which comprises reacting a compound selected from the group consisting of 1,5-dicyano pentanone-3, 1,6-dicyano hexanone-3, 1,7-dicyano heptanone-4, and organic substituted derivatives thereof, said organic substituents selected from the group consisting of hydrocarbon alkyl, aralkyl, phenyl and alkylaryl radicals and alkoxyaryl, radicals having from 1 to 10 carbon atoms with hydrogen at a temperature varying between 50 and 300° C. and a hydrogen pressure of 300 to 3,000 p.s.i.g. in the presence of a hydrogenation catalyst selected from the group consisting of supported and unsupported platinum group metals and metal oxides, nickel, Raney nickel and Raney cobalt for a time sufficient to secure said cyclic amine compound, at least a portion of said reaction conducted in the presence of a solvent.

2. The process of claim 1 wherein said hydrogenation reaction is conducted at a temperature varying between about 200 and 275° C.

3. The process of claim 1 wherein said hydrogenation reaction is conducted at a temperature varying between 75 and 150° C. until hydrogen uptake is substantially completed and thereafter continuing said hydrogenation at a temperature between about 225 and 300° C. for a time sufficient to obtain a substantial yield of said product.

4. The process of claim 1 wherein a 1,5-dicyano pentanone-3 is hydrogenated for a time sufficient to secure a 1-aza bicyclo (3.3.0) octane.

5. The process of claim 1 wherein said keto dinitrile is phorone dinitrile and the product recovered from the hydrogenation is 1-aza 3,3,7,7-tetramethyl bicyclo (3.3.0) octane.

6. A compound selected from the group consisting of:

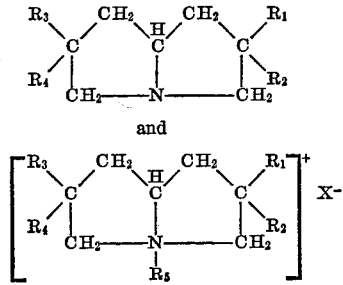

and

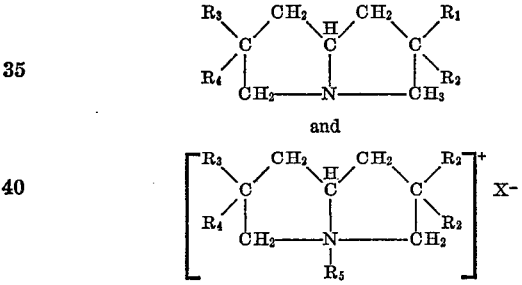

wherein $R_1$, $R_2$, $R_3$ and $R_4$ are each selected from the group consisting of hydrocarbon alkyl, aralkyl, phenyl, and alkylaryl radicals and alkoxyaryl radicals having from 1 to 10 carbon atoms; $R_5$ is selected from the group consisting of a hydrogen radical and hydrocarbon alkyl and bis-(alkylene)phenyl radicals having from 1 to 30 carbon atoms; and X is selected from the group consisting of fluoride, bromide, iodide, chloride, cyanide, sulfate, sulfite and hydroxy anions.

7. The compound of claim 6 wherein $R_1$, $R_2$, $R_3$ and $R_4$ are alkyl radicals having from 1 to 10 carbon atoms.

8. 1-aza 3,3,7,7-tetramethyl bicyclo (3.3.0) octane.

9. 1-aza 3,7-bis(p-methoxy phenyl) bicyclo (3.3.0) octane.

10. A compound having the formula

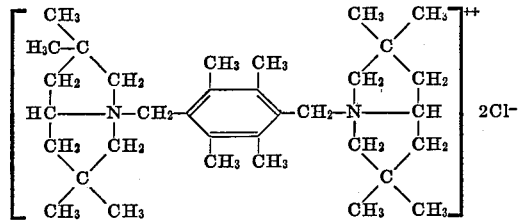

11. A compound having the formula

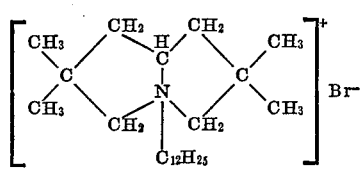

12. The process of claim 1 wherein said hydrogenation reaction is conducted at a temperature varying between 75 and 150° C. at a hydrogen pressure varying between 700 and 1000 p.s.i.g. until hydrogen uptake is substantially completed and thereafter continuing said hydrogenation at a temperature between about 225° and 300° C. at a hydrogen pressure varying from 500 to 1500 p.s.i.g. for a time sufficient to obtain a substantial yield of said cyclic amine compound.

13. The process of claim 1 wherein the said hydrogenation catalyst is selected from the group consisting of platinum oxide and Raney nickel.

14. The process of claim 12 wherein the reaction is conducted in the presence of from 5 to 90 wt. percent, based on the total reaction mixture, of a solvent until hydrogen uptake is substantially completed.

15. The process of claim 14 wherein said solvent is selected from the group consisting of ethanol and tetrahydrofuran.

16. The process of claim 1 wherein said organic substituents are hydrocarbon alkyl radicals having from 1 to 10 carbon atoms.

17. The process of claim 1 wherein said organic substituents are selected from the group consisting of methyl and ethyl radicals.

18. The composition of claim 6 wherein $R_1$, $R_2$, $R_3$ and $R_4$ are selected from the group consisting of methyl and ethyl radicals.

19. The composition of claim 6 wherein X is selected from the group consisting of chloride and bromide anions.

20. A compound selected from the group consisting of:

and wherein $R_1$, $R_2$, $R_3$ and $R_4$ are selected from the group consisting of hydrogen radicals and organic radicals selected from the group consisting of hydrocarbon aralkyl, phenyl and alkylaryl radicals and alkoxyaryl radicals having from 1 to 10 carbon atoms, at least one organic radical substituted at the 3 and 7 positions of said compound; $R_5$ is selected from the group consisting of a hydrogen radical and hydrocarbon alkyl bis-(alkylene) phenyl radicals having from 1 to 30 carbon atoms; and X is selected from the group consisting of fluoride, bromide, iodide, chloride, cyanide, sulfate, sulfite and hydroxy anions.

21. A compound selected from the group consisting of and wherein $R_1$, $R_2$, $R_3$ and $R_4$ are each selected from the group consisting of hydrogen radicals and organic radicals selected from the group consisting of hydrocarbon alkyl, aralkyl, phenyl, and alkylaryl radicals and alkoxyaryl radicals having from 1 to 10 carbon atoms, at least three of said $R_1$, $R_2$, $R_3$ and $R_4$ being organic radicals; $R_5$ is selected from the group consisting of a hydrogen radical and hydrocarbon alkyl bis-(alkylene)phenyl radicals having from 1 to 30 carbon atoms; and X is selected from the group consisting of fluoride, bromide, iodide, chloride, cyanide, sulfate, sulfite and hydroxy anions.

22. the composition of claim 21 wherein said organic radicals are alkyl radicals having from 1 to 10 carbon atoms.

References Cited

UNITED STATES PATENTS 3,246,006  12/1966  Gruber _____ 260—326.8X

ALEX MAZEL, Primary Examiner

J. A. NARCAVAGE, Assistant Examiner

U.S. Cl. X.R.

252—50, 51.5; 260—2, 326.8, 326.87, 465, 465.8, 999